US 7,061,397 B2

(12) United States Patent
Haselsteiner et al.

(10) Patent No.: US 7,061,397 B2
(45) Date of Patent: Jun. 13, 2006

(54) ANTITHEFT PROTECTION SYSTEM, METHOD FOR OPERATING AN ANTITHEFT PROTECTION SYSTEM AND COMPONENTS OF AN ANTITHEFT PROTECTION SYSTEM

(75) Inventors: Mario Haselsteiner, Haibuehl (DE); Birgit Rösel, Regensburg (DE); Klaus Hofbeck, Neumarkt (DE); Arnd Stielow, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 253 days.

(21) Appl. No.: 10/272,234

(22) Filed: Oct. 16, 2002

(65) Prior Publication Data

US 2003/0095031 A1 May 22, 2003

(51) Int. Cl.
*G08B 5/22* (2006.01)
*G08C 19/00* (2006.01)

(52) U.S. Cl. .................... 340/825.49; 340/825.69; 340/5.7

(58) Field of Classification Search .......... 340/825.49, 340/825.69, 825.72, 5.72, 5.61, 5.64, 5.7, 340/5.71; 341/176, 173; 455/42; 701/1, 701/2, 36, 45
See application file for complete search history.

(56) References Cited

U.S. PATENT DOCUMENTS

| 4,054,837 A * | 10/1977 | Hibbs et al. ............... 455/84 |
| 4,723,121 A | 2/1988 | van den Boom et al. .............. 340/825.31 |
| 5,001,486 A | 3/1991 | Bächtiger ................... 342/42 |
| 5,051,741 A | 9/1991 | Wesby ................... 340/825.49 |
| 5,307,193 A * | 4/1994 | VanZeeland et al. ........ 398/126 |
| 5,463,374 A * | 10/1995 | Mendez et al. ............. 340/442 |
| 5,649,295 A | 7/1997 | Shober et al. ............. 455/38.2 |
| 5,670,933 A * | 9/1997 | Hayashi ................. 340/426.12 |
| 5,736,793 A * | 4/1998 | Jahrsetz et al. ............ 307/10.1 |
| 5,815,108 A * | 9/1998 | Terk ........................... 341/176 |
| 5,838,255 A * | 11/1998 | Di Croce ............... 340/825.69 |
| 5,917,449 A | 6/1999 | Sanderford et al. ......... 342/457 |
| 5,956,259 A | 9/1999 | Hartsell, Jr. et al. .... 364/528.37 |
| 6,046,683 A | 4/2000 | Pidwerbetsky et al. 340/825.54 |
| 6,064,320 A | 5/2000 | d'Hont et al. .............. 340/933 |
| 6,078,252 A * | 6/2000 | Kulczycki et al. ........ 340/425.5 |
| 6,101,428 A * | 8/2000 | Snyder ....................... 701/2 |
| 6,107,910 A | 8/2000 | Nysen ........................ 340/10.1 |
| 6,179,273 B1 | 1/2001 | Edmunds, III et al. .... 256/13.1 |
| 6,236,333 B1 | 5/2001 | King ..................... 340/825.31 |
| 6,259,991 B1 | 7/2001 | Nysen ........................ 701/300 |
| 6,323,566 B1 | 11/2001 | Meier ........................ 307/10.2 |
| 6,353,776 B1 * | 3/2002 | Rohrl et al. ................... 701/1 |
| 6,380,845 B1 | 4/2002 | Tuttle ........................ 340/10.4 |
| 6,414,586 B1 * | 7/2002 | Yoshizawa .................. 340/5.2 |
| 6,414,592 B1 * | 7/2002 | Dixit et al. ................. 340/447 |
| 6,414,626 B1 | 7/2002 | Greef et al. ................. 342/127 |
| 6,424,056 B1 * | 7/2002 | Irvin ........................ 307/10.1 |
| 6,429,768 B1 * | 8/2002 | Flick ........................ 340/5.2 |

(Continued)

FOREIGN PATENT DOCUMENTS

DE 2537421 7/1976

(Continued)

*Primary Examiner*—Michael Horabik
*Assistant Examiner*—Nam Nguyen
(74) *Attorney, Agent, or Firm*—Baker Botts L.L.P.

(57) ABSTRACT

An antitheft protection system for a vehicle (10) comprises at least one transmitting and receiving unit (12) connected to the vehicle (10), at least one code transmitter (18), which can communicate with the at least one transmitting and receiving unit (12), and at least one base unit (14), which wirelessly communicates with the at least one transmitting and receiving unit (12).

14 Claims, 1 Drawing Sheet

U.S. PATENT DOCUMENTS

| | | | |
|---|---|---|---|
| 6,438,466 B1 | 8/2002 | Voigtlaender et al. | 701/1 |
| 6,438,467 B1 * | 8/2002 | Pacsai | 701/2 |
| 6,448,892 B1 * | 9/2002 | Delaporte | 340/442 |
| 6,480,098 B1 * | 11/2002 | Flick | 340/7.2 |
| 6,538,560 B1 | 3/2003 | Stobbe et al. | 340/5.72 |
| 6,597,284 B1 * | 7/2003 | Juzswik | 340/442 |
| 6,617,975 B1 * | 9/2003 | Burgess | 340/815.47 |
| 6,693,581 B1 | 2/2004 | Gottwald et al. | 342/70 |
| 6,697,616 B1 | 2/2004 | Heinz et al. | 455/424 |
| 6,809,629 B1 | 10/2004 | Heide et al. | 340/5.61 |
| 2002/0008615 A1 | 1/2002 | Heide et al. | 340/426 |

FOREIGN PATENT DOCUMENTS

| | | |
|---|---|---|
| DE | 3838657 | 5/1990 |
| DE | 9410369 U1 | 11/1994 |
| DE | 4329697 | 3/1995 |
| DE | 29607877 U1 | 9/1996 |
| DE | 4409167 | 3/1998 |
| DE | 19752029 | 6/1999 |
| DE | 19825702 | 12/1999 |
| DE | 19927319 A1 | 12/2000 |
| DE | 19957536 A1 | 6/2001 |
| DE | 10038297 A1 | 3/2002 |
| EP | 0848123 | 6/1998 |
| FR | 2749607 | 12/1997 |
| GB | 2179751 | 3/1987 |
| JP | 07057792 | 3/1995 |
| JP | 09312190 | 12/1997 |
| WO | 99/59284 | 11/1999 |

* cited by examiner

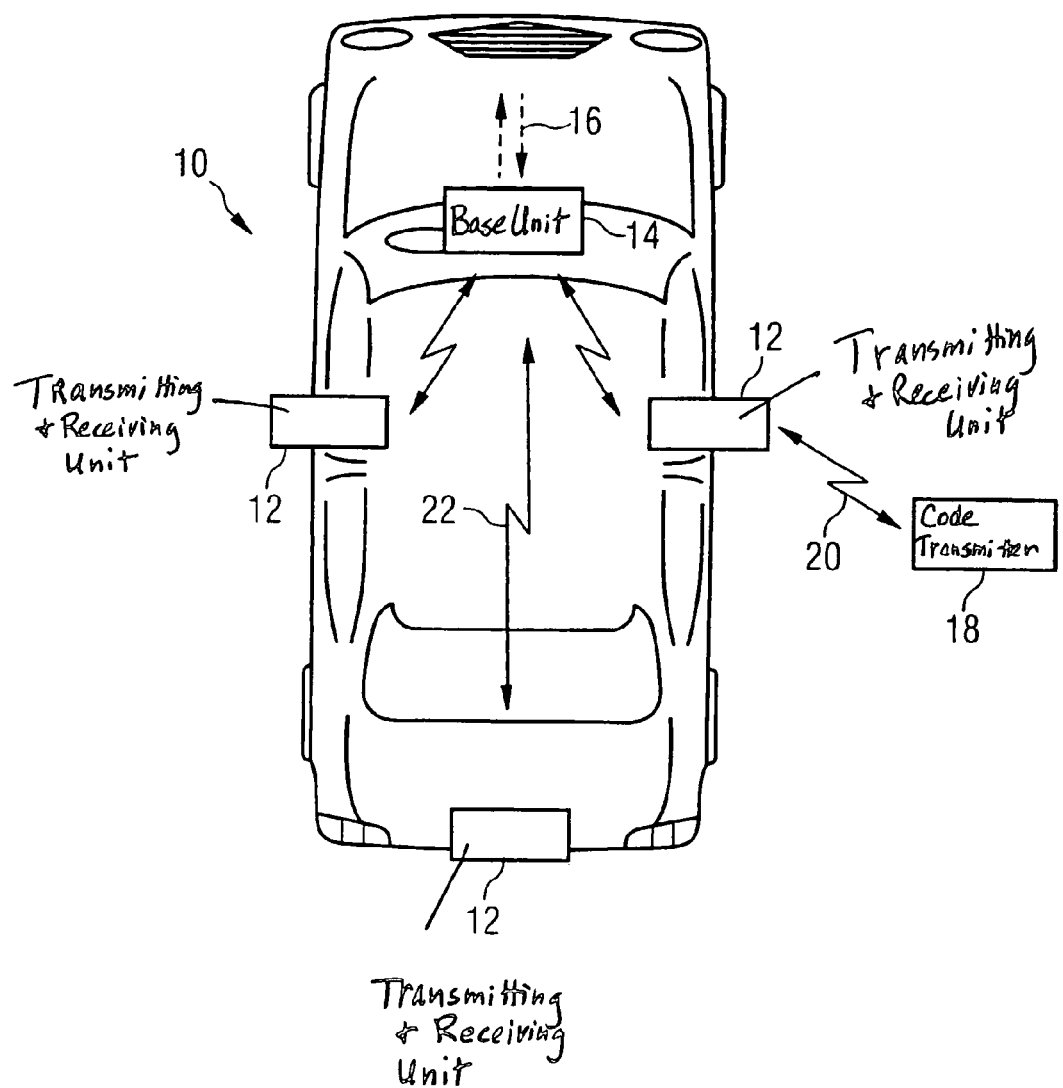

ANTITHEFT PROTECTION SYSTEM, METHOD FOR OPERATING AN ANTITHEFT PROTECTION SYSTEM AND COMPONENTS OF AN ANTITHEFT PROTECTION SYSTEM

CROSS REFERENCE TO RELATED APPLICATION

This application claims foreign priority to German application number 10151034.9 filed Oct. 16, 2001.

BACKGROUND OF THE INVENTION

The invention relates to an antitheft protection system for a vehicle having at least one transmitting and receiving unit connected to the vehicle, at least one code transmitter, which can communicate with the at least one transmitting and receiving unit, and at least one base unit, which can communicate with the at least one transmitting and receiving unit.

The invention furthermore relates to a method for operating an antitheft protection system for a vehicle, in which at least one transmitting and receiving unit connected to the vehicle communicates with at least one code transmitter, and at least one base unit communicates with the at least one transmitting and receiving unit.

Furthermore, the invention relates to components of an antitheft protection system.

Generic systems, methods and components often serve as a replacement for the mechanical locking systems that are conventionally present on a motor vehicle. The systems operate on the basis of a code which is communicated by a code transmitter to a receiving unit in a motor vehicle. Generally, a plurality of transmitting and receiving units equipped with antennas are arranged at different positions on the vehicle, thereby ensuring that the signals communicated by the code transmitter are received. The presence of transmitting and receiving units on different sides of a vehicle can additionally provide a side selectivity based on which the side of the vehicle on which the person actuating the code transmitter is situated is identified.

The signals received by the transmitting and receiving units are then forwarded within the vehicle to a base unit or control unit, in which they are evaluated. This base unit generally communicates with the vehicle bus, so that if appropriate, that is to say in particular in the case of a correct code, actuation of the locking system of the vehicle can be initiated.

In addition to the code which is communicated by the code transmitter, it is possible to use further criteria for the actuation of the locking system. For security reasons, it may be desirable, for example, to permit opening only when the code transmitter is not beyond a specific maximum distance, for example 6 m. The risk of inadvertent actuation of the locking system can be reduced in this way. Such a maximum distance can be realized for example by using electromagnetic fields with limited range for the communication, so that distance limitation is intrinsically present. However, it may also be desirable, in principle, to enable larger communication distances and to utilize the knowledge of the present distance between the code transmitter and the vehicle for providing special functionalities. For example, it may be practical to switch on the interior light of the vehicle by actuating a code transmitter even at a distance of, for example, 8 m from the vehicle—therefore, communication must already be possible at this point in time, while actuation of the locking system should not yet be possible—and to enable opening of the vehicle only at a distance of, for example, 2 m. For this purpose, systems are known which operate at frequencies in the microwave range in order thus to determine the distances between the code transmitter and the vehicle by using radar methods.

For the communication of the transmitting and receiving units with the base unit, electrical lines are laid within the motor vehicle. If it is additionally desired to carry out a distance measurement in connection with the antitheft protection system, the requirements made of the electrical connections between the transmitting and receiving units and the base unit are elevated, since signals with high data rates or with a very large bandwidth have to be transmitted to the central base unit. Such cabling is extremely costly both on account of the radio frequency cable required and on account of production.

In order to avoid the cabling outlay between the transmitting and receiving units and the base unit, it is possible to evaluate the signals directly at the vehicle antennas in the transmitting and receiving units. However, this necessitates the use of highly complex and therefore costly antenna modules. Complex and costly antenna modules are necessary, in particular, if the latter are intended to be able to determine the distance between vehicle and code transmitter and thus to provide the abovementioned advantages of a distance measurement.

SUMMARY OF THE INVENTION

The invention is based on the object of providing an antitheft protection system, a method for operating an antitheft protection system and components of an antitheft protection system, the disadvantages of the prior are being eliminated and costs being reduced in comparison with the systems of the prior art, with the same or increased reliability.

This object is achieved by means of an antitheft protection system for a vehicle comprising:
  at least one transmitting and receiving unit connected to the vehicle,
  at least one code transmitter, which can communicate with the at least one transmitting and receiving unit, and
  at least one base unit, which can communicate with the at least one transmitting and receiving unit, wherein
  the communication between the at least one transmitting and receiving unit and the at least one base unit is effected in a wireless manner, and wherein
  on the basis of the signals communicated during the communication between the at least one transmitting and receiving unit and the at least one base unit, in the at least one base unit, it is possible to determine a quantity as a measure of the distance between the at least one transmitting and receiving unit and the at least one base unit, in the at least one base unit.

The object can be furthermore achieved by a method for operating an antitheft protection system for a vehicle, wherein:
  at least one transmitting and receiving unit connected to the vehicle communicates with at least one code transmitter, and
  at least one base unit communicates with the at least one transmitting and receiving unit, characterized
  the communication between the at least one transmitting and receiving unit and the at least one base unit is effected in a wireless manner, and on the basis of the signals communicated during the communication between the at least one transmitting and receiving unit and the at least one base unit, in the at least one base unit, a quantity is determined as a measure of the distance between the at least one transmitting and receiving unit and the at least one base unit, in the at least one base unit.

Advantageous embodiments of the invention are specified in the dependent claims.

The invention builds on the antitheft protection system of the generic type in that the communication between the at least one transmitting and receiving unit and the at least one base unit is effected in a wireless manner, and in that, on the basis of the signals communicated during the communication between the at least one transmitting and receiving unit and the at least one base unit, in the at least one base unit, it is possible to determine a quantity as a measure of the distance between the at least one transmitting and receiving unit and the at least one base unit, in the at least one base unit. In this way, it is possible to dispense with costly cabling between the transmitting and receiving units and the base unit. Likewise, it is not necessary to equip the transmitting and receiving units in complex fashion, so that the latter perform the evaluation of the signals of the code transmitter; rather, this task can be performed centrally by the base unit, so that costs can likewise be reduced on account of transmitting and receiving units equipped in simple fashion. In particular a distance determination is performed centrally by the base unit, so that the advantages of the distance determination can be utilized, but there is no need for costly antenna modules.

The system according to the invention is developed with particular advantages in that the at least one transmitting and receiving unit can forward signals with a defined or with no phase offset. In this way, known radar techniques can be used in order to determine the distance between vehicle and code transmitter.

The invention exhibits its particular advantages when a plurality of transmitting and receiving units are provided, which communicate with the same base unit. The provision of a plurality of transmitting and receiving units has the advantage that the signals emitted by a code transmitter are reliably received. Likewise, it is possible to provide a selectivity and thus to utilize the knowledge of the position of the code transmitter. In systems of the prior art, it is necessary, then, to use cabling to connect the base unit to all the transmitting and receiving units, radio frequency cable having to be used for the cabling for example in the case of a distance measurement. This results in a considerable outlay manifested for example in costly line routing in the region of the base unit. On the basis of the present invention, namely the wireless communication between base unit and transmitting and receiving unit, the outlay described is obviated, and at the same time it is possible to determine a distance to the code transmitter.

Likewise, it may advantageously be provided that the communication between the at least one transmitting and receiving unit and the at least one base unit is effected with the participation of at least one directional antenna. Such a directional antenna, which is preferably part of the transmitting and receiving unit, can preferably be pivoted electronically and/or mechanically. In this way, it is possible to cover the entire region around the vehicle. The signals arriving at the vehicle from the code transmitter can be communicated to the base unit for example whilst maintaining the phase angle with a directional characteristic of an antenna assigned to the transmitting and receiving unit. The base unit may likewise be equipped with a directional function, although in the sense of a point-to-multipoint system with a directional characteristic such that communication with all the transmitting and receiving units is possible.

The invention is furthermore advantageously developed in that the at least one transmitting and receiving unit operates as a bidirectional amplifier. In this way, the entire signal processing is furthermore effected in the central base unit, and the transmitting and receiving units are configured in simple fashion.

It may likewise be provided within the scope of the present invention that means for evaluating received signals are provided in the base unit, and that the evaluation means determine a quantity which is a measure of the distance between vehicle and code transmitter. In this way, the distance between a code transmitter and a vehicle can be determined centrally in a base unit, without requiring costly radio frequency cabling between the transmitting and receiving units and the base unit.

Furthermore, it is particularly useful if the base unit is connected to a data bus. The evaluation result determined in the base unit can thus be communicated via the data bus.

It is particularly useful if the system operates in the GHz range. In this frequency range, by way of example, a directional function of the participating antennas can be realized more simply than in the case of systems which operate in the MHz range.

The invention builds on the method of the generic type in that the communication between the at least one transmitting and receiving unit and the at least one base unit is effected in a wireless manner, and in that, on the basis of the signals communicated during the communication between the at least one transmitting and receiving unit and the at least one base unit, in the at least one base unit, a quantity is determined as a measure of the distance between the at least one transmitting and receiving unit and the at least one base unit, in the at least one base unit. In this way, the advantages of the system according to the invention are also implemented in the context of a method. This also applies to the advantageous embodiments of the method according to the invention which are described below.

The method according to the invention is furthermore advantageously developed in that the at least one transmitting and receiving unit forwards signals with a defined or with no phase offset.

The method according to the invention is advantageously developed in that a plurality of transmitting and receiving units are provided, which communicate with the same base unit.

Likewise, it is preferred within the scope of the method according to the invention that the communication between the at least one transmitting and receiving unit and the at least one base unit is effected with the participation of at least one directional antenna.

Furthermore, the method is advantageous in that the at least one transmitting and receiving unit operates as a bidirectional amplifier.

The method according to the invention is preferably developed in that in that signals received in the base unit are evaluated, and in that a quantity is determined which is a measure of the distance between vehicle and code transmitter.

The method according to the invention can be carried out in a particularly advantageous manner by virtue of the fact that the base unit is connected to a data bus.

It is likewise usefully provided that the method according to the invention operates in the GHz range.

The invention furthermore consists in a transmitting and receiving unit for use in an antitheft protection system according to the invention.

Furthermore, the invention consists in a base unit for use in an antitheft protection system according to the invention.

The invention is based on the insight that a particularly cost-effective solution can be made available on the basis of a wireless connection between the transmitting and receiving units and the base unit of an antitheft protection system. On the one hand, it is possible to use very simply structured transmitting and receiving units, since the signals are processed centrally in a base unit. On the other hand, a cabling outlay, in particular cabling with radio frequency cables, can be made dispensable on the basis of the present invention. The provision of transmitting and receiving units which can preferably forward signals with no or with a defined phase offset, makes it possible, on the basis of conventional radar methods, to determine the distance between the code transmitter and the vehicle and thus to realize numerous advantages on the basis of knowledge of the distance.

BRIEF DESCRIPTION OF THE DRAWING

The invention will now be explained by way of example using a preferred embodiment with reference to the accompanying drawing, in which:

FIG. 1 shows a diagrammatic, illustration of a motor vehicle with an antitheft protection system according to the invention.

DETAILED DESCRIPTION OF THE PREFERRED EMBODIMENTS

FIG. 1 shows a diagrammatic illustration of a motor vehicle 10 with an antitheft protection system according to the invention. The motor vehicle 10 comprises a plurality of transmitting and receiving units 12 arranged at different positions on or in the motor vehicle 10. Furthermore, the motor vehicle 10 contains a base unit 14 or control unit. The base unit 14 is connected to a data bus 16 of the motor vehicle 10. A code transmitter 18 or ID transmitter is illustrated outside the motor vehicle 10.

The code transmitter 18 communicates with the transmitting and receiving units 12 of the motor vehicle 10 by means of radio frequency signals 20. The signals 20 of the code transmitter 18 which are received by the transmitting and receiving units 12 of the motor vehicle 10 are forwarded to the base unit 14 likewise as radio frequency signals 22, so that wireless communication is also effected between the transmitting and receiving units 12 and the base unit 14. The transmitting and receiving units 12 are equipped with antennas which can operate as directional antennas. In particular they lengthen the signals 20 arriving from the code transmitter 18 toward the base unit 14. This ensures that the phase angle of the signals 20 arriving from the code transmitter 18 is forwarded unchanged to the base unit 14 via the signals 22. The entire signal processing is furthermore effected in the central base unit 14, so that the transmitting and receiving units 12 can be realized in a simple manner as bidirectional amplifiers and possibly as converters.

The features of the invention that are disclosed in the above description, in the drawings and in the claims may be essential to the realization of the invention both individually and in any desired combination.

The invention claimed is:

1. An antitheft protection system for a vehicle comprising:
at least two transmitting and receiving units located in or on the vehicle,
at least one code transmitter to communicate with the at least two transmitting and receiving units,
at least one base unit located in the vehicle to communicate with the at least two transmitting and receiving units, wherein
the communication between the at least two transmitting and receiving units and the at least one base unit is effected in a wireless manner, and
the distance between the at least one code transmitter and the vehicle is determined in the at least one base unit on the basis of signals communicated between the transmitting and receiving units and the at least one base unit.

2. An antitheft protection system according to claim 1, wherein the signals of the at least two transmitting and receiving units received from the code transmitter are forwarded to the at least one base unit having a defined phase offset or no phase offset.

3. An antitheft protection system according to claim 1, further comprising at least one additional transmitting and receiving unit operable to communicate with the base unit.

4. An antitheft protection system according to claim 1, wherein the communication between the at least two transmitting and receiving units and the at least one base unit is effected with the participation of at least one directional antenna.

5. An antitheft protection system according to claim 1, wherein the at least two transmitting and receiving units operate as bidirectional amplifiers.

6. An antitheft protection system according to claim 1 further comprising:
means for evaluating received signals in the base unit operable to determine a quantity which is a measure of-the distance between the vehicle and the code transmitter.

7. An antitheft protection system according to claim 1, wherein the base unit is connected to a data bus.

8. An antitheft protection system according to claim 1, wherein the system operates in the GHz range.

9. A method for operating an antitheft protection system for a vehicle comprising:
providing at least two transmitting and receiving units located in or on the vehicle, said units forwarding signals from a code transmitter, said signals having a defined or no phase offset, and
providing at least one base unit in wireless communication with the at least two transmitting and receiving units and receiving signals forwarded by the at least two transmitting and receiving units from the code transmitter;
evaluating signals received in the base unit, and
determining a quantity which is a measure of the distance between vehicle and code transmitter.

10. A method according to claim 9 further comprising at least one additional transmitting and receiving unit operable to wirelessly communicate with the base unit.

11. A method according to claim 9, wherein the communication between the at least two transmitting and receiving units and the at least one base unit is effected with the participation of at least one directional antenna.

12. A method according to claim 9, wherein the at least two transmitting and receiving units operate as bidirectional amplifiers.

13. A method according to claim 9, wherein the base unit is connected to a data bus.

14. A method according to claim 9, wherein the system operates in the GHz range.

* * * * *

UNITED STATES PATENT AND TRADEMARK OFFICE
CERTIFICATE OF CORRECTION

| | |
|---|---|
| PATENT NO. | : 7,061,397 B2 |
| APPLICATION NO. | : 10/272234 |
| DATED | : June 13, 2006 |
| INVENTOR(S) | : Mario Haselsteiner et al. |

It is certified that error appears in the above-identified patent and that said Letters Patent is hereby corrected as shown below:

On title page
Please insert the following Foreign Application Priority Data on the face of the patent at line item (30):

October 16, 2001    (DE)    101 51 034

Signed and Sealed this

Nineteenth Day of December, 2006

JON W. DUDAS
*Director of the United States Patent and Trademark Office*